US005855713A

United States Patent [19]
Harvey

[11] Patent Number: 5,855,713
[45] Date of Patent: Jan. 5, 1999

[54] METHOD OF MAKING A MULTI-CHANNEL DROPLET DEPOSITION APPARATUS

[75] Inventor: Robert Alan Harvey, Cambridge, England

[73] Assignee: XAAR Technology Limited, Cambridge, England

[21] Appl. No.: 633,672

[22] Filed: Apr. 17, 1996

Related U.S. Application Data

[63] Continuation of PCT/GB74/0234, Oct. 22, 1993.

[30] Foreign Application Priority Data

Oct. 22, 1993 [GB] United Kingdom .................... 9321786

[51] Int. Cl.$^{6}$ .............................. B41J 2/015; G01D 15/18

[52] U.S. Cl. ................... 156/153; 156/272.8; 156/273.3; 156/275.7; 156/321; 156/324.4; 347/47

[58] Field of Search ................................ 156/153, 272.8, 156/273.3, 275.7, 321, 324.4; 347/47

[56] References Cited

U.S. PATENT DOCUMENTS

| | | | |
|---|---|---|---|
| 4,994,825 | 2/1991 | Saito et al. | 346/140 R |
| 5,010,356 | 4/1991 | Albinson | 346/140 R |
| 5,032,209 | 7/1991 | Shinbach et al. | 156/272.8 |
| 5,189,437 | 2/1993 | Michaelis et al. | 346/1.1 |
| 5,439,728 | 8/1995 | Morozumi et al. | 347/47 |

FOREIGN PATENT DOCUMENTS

| | | |
|---|---|---|
| 309 148 A3 | 3/1989 | European Pat. Off. . |
| 38 38 538 A1 | 5/1990 | Germany . |
| 56-113470 | 9/1981 | Japan . |
| 62-124956 | 6/1987 | Japan . |

*Primary Examiner*—Jeff H. Aftergut
*Attorney, Agent, or Firm*—Marshall, O'Toole, Gerstein, Murray & Borun

[57] ABSTRACT

In a method of making an ink jet printhead, corrugations are formed by laser ablation in the bonding surface of a polymer nozzle plate. Adhesive is applied to the micro-cavities thus formed and the nozzle plate is pressed against the end surface of the printhead until the surface lands in the nozzle plate abut on the surface of the printhead.

40 Claims, 4 Drawing Sheets

METHOD OF MAKING A MULTI-CHANNEL DROPLET DEPOSITION APPARATUS

This application is a continuation of International Application No. PCT/GB94/02341 filed Oct. 24, 1994.

The present invention relates to droplet deposition apparatus and especially to ink jet printheads. In particular it relates to methods for bonding the nozzle plate during printhead assembly.

In U.S. Pat. No. 5,189,437 (EP-A-0309146) the method is disclosed of forming nozzles in a nozzle plate of polymer material, after the nozzle plate is bonded to the ink jet printhead, the location and alignment of the nozzles being registered optically. For example, the nozzles are formed by exposing the nozzle plate in regions defined by coplanar apertures in a mask with pulsed UV radiation of appropriate energy density for ablation of the polymer material using an excimer laser.

The accuracy of the nozzle size depends on the accuracy of the location of the nozzle plate during ablation. In particular, if the nozzles are tapered towards the nozzle exit, and are formed by angling or rocking the incident beam of light, an error in the axial location of the nozzle plate relative to the mask in the region of a nozzle results in departure in the nozzle diameter from the design value. Accordingly, it is desirable to bond the nozzle plate to the body of the printhead in such a way that it is flat. As a general rule, the nozzle manufacturing tolerances require that the nozzle plate should be applied flat within one or a few wavelengths of light and is accordingly optically flat.

The nozzle plate may be bonded onto the body of the printhead in a straightforward manner by applying a layer of glue to the back of the blank nozzle plate and applying it under pressure to the printhead with an optically flat anvil. The anvil is heated so as to allow the glue to flow and form a seal between the back of the plate and the ink channel terminations and then to cure. However, this approach has given rise to unexpected difficulties. These are due fundamentally to the very fine scale, typically 4–20 channels per mm (100–500 channels per inch) at which the printhead is made.

One problem arises if excess glue is applied to the nozzle plate. On application of heat and pressure, any excess may spread to fill the end regions of the channels adjacent the nozzle plate. As a result nozzles may be incompletely formed because ablation may not penetrate the glue contained in the blocked channel end region.

A thin layer of glue applied to the nozzle plate likewise presents difficulties. First, the body of the printhead adjacent to the nozzle plate requires to be dressed by grinding or lapping, so that it is also flat with height variations or roughness no greater than the thickness of the bond layer. The glue layer can of course only fill gaps between rough mating surfaces if a sufficiently thick layer of glue is available. Providing too little glue results in un-bonded regions of the nozzle plate and may leave ink leakage paths between adjacent channels.

Second, when the glue has cooled and is set, the polymer nozzle plate shrinks and, due to the fact that the thermal expansion coefficient of the polymer material which it comprises is typically greater than that of the ceramic from which the body of the printhead is formed, residual stresses are established in the bond layer. When the bond layer is made thin, the stresses are correspondingly greater. Typically these are shear stresses confined to the periphery of the bond causing it to fail by crack propagation and peeling. Loss of the seal between the back of the nozzle plate and the body of the printhead due to crack growth round the channel, creates an ink leakage path which is likely to result in an operational failure of that channel. Such a failure may occur at any time during the life of the printhead.

Since either too thick or too thin a glue layer causes problems, very precise control of the glue layer thickness is required. This is difficult to achieve in production.

Failure of the bond layer by crack propagation usually occurs along the interface between the glue and one of the mating surfaces. Generally it is the polymer-glue interface of the nozzle plate that fails, rather than the ceramic-glue interface adjacent the printhead body, because the latter is initially rough and possesses higher surface energy. The polymer is a rolled sheet which is comparatively smooth and lacks bond sites where chemical bonds can form, therefore having a lower surface energy.

One objective of the present invention is to provide an improved method for applying the nozzle plate to the body of the printhead, in which the nozzle plate after bonding is held flat to within the desired tolerances; and which enables the formation of nozzles with accurate and repeatable dimensions. A further object of the invention is to provide a rapid and reliable bonding process without the flow of excess glue into the channels. An additional objective is to form a glue bond between the nozzle plate and the printhead body in which the residual stresses of thermal origin are low compared with the peel strength of the glue adhesion so as to ensure integrity of the nozzle plate bond through the life of the printhead.

Accordingly, the present invention consists in a method of making multichannel droplet deposition apparatus, comprising the steps of forming a body with a plurality of parallel channels terminating in a common channel termination plane; providing a nozzle plate for mounting on the body at the termination plane to provide, through apertures in the nozzle plate, respective droplet ejection nozzles for the channels, said nozzle plate having a bonding surface provided with surface micro-cavities and bonding surface lands; applying adhesive to the bonding surface of the nozzle plate so as to fill said cavities; placing the nozzle plate in register with the body; bringing the lands of the nozzle plate bonding surface substantially into contact with the termination plane of the body and promoting hardening of the adhesive.

Advantageously, the micro-cavities in the nozzle plate are formed by the removal of material from a surface of a nozzle plate blank preferably using a laser beam and still more preferably by ablation.

Suitably, the micro-cavities are formed in a regular array and take the form, for example, of grooves with a mean spacing of preferably between 5 and 50 $\mu$m and still more preferably between 10 and 20 $\mu$m.

According to another aspect, the present invention consists in multichannel droplet deposition apparatus, comprising a body with a plurality of parallel channels terminating in a common channel termination plane; a nozzle plate mounted on the body at the termination plane to provide, through apertures in the nozzle plate, respective droplet ejection nozzles for the channels, said nozzle plate having a bonding surface provided with surface micro-cavities and bonding surface lands, the micro-cavities having a depth perpendicular to said termination plane of from 2–20 $\mu$m and said bonding surface lands being coplanar to within 1 $\mu$m; and an adhesive bond layer situated between the bonding surface of the nozzle plate and said termination plane of the body.

Advantageously, said body comprises channel separating side walls, each having a cross sectional area in said termination plane, there being at least three bonding surface lands within the cross sectional area of each channel separating side wall.

Preferably, the depth of the micro-cavities is between 2 and 5 μm.

According to a further aspect, the present invention consists in a method of making multichannel droplet deposition apparatus, comprising the steps of forming a body with a plurality of parallel channels terminating in a common channel termination plane; providing a first bonding surface at said channel termination plane; providing a nozzle plate for mounting on the body at the termination plane to provide, through apertures in the nozzle plate, respective droplet ejection nozzles for the channels, providing a second bonding surface on said nozzle plate; forming a regular array of surface micro-cavities and bonding surface lands in one of said first and second bonding surfaces; applying adhesive so as to fill said micro-cavities; placing the nozzle plate in register with the body; bringing the lands of said one bonding surface substantially into contact with the other bonding surface and promoting hardening of the adhesive.

Preferably, the micro-cavities are formed using a laser beam.

Suitably, the surface energy of said one bonding surface is increased in the laser beam formation of micro-cavities therein.

The present invention will now be described by way of example by reference to the following diagrams, of which:

Figure 1:
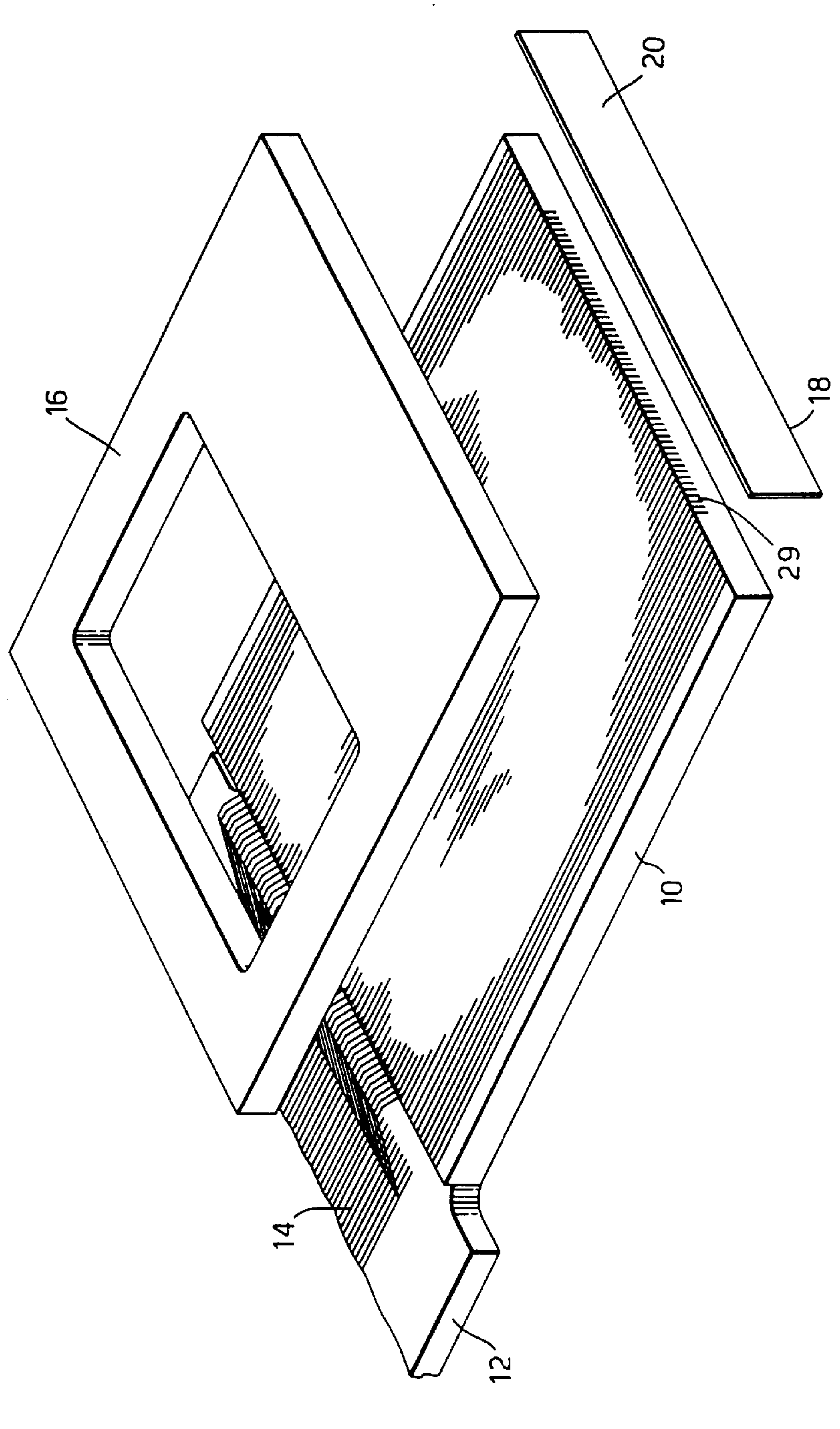
FIG. 1 illustrates an exploded view in perspective of one form of ink jet printhead showing a printhead base, a cover and a nozzle plate.

FIG. 1 shows an exploded view in perspective of an ink jet printhead incorporating piezo-electric wall actuators operating in shear mode. It comprises a base 10 of piezo-electric material mounted on a circuit board 12 of which only a section showing connection tracks 14 is illustrated. A cover 16, which is bonded during assembly to the base 10 is shown above its assembled location. A nozzle plate 18 is also shown adjacent the printhead base. This is a polymer sheet coated on its outer surface with a low energy surface coating 20 as for example shown in U.S. Pat. No. 5,010,356 (EP-A-0367438). Although the present invention, which relates to methods for bonding the nozzle plate to a printhead body, is described herein in terms which relate to a particular form of printhead, it may also be applied to any alternative ink jet printhead technology in which drop ejection is effected from nozzles formed in a nozzle plate (such as result from pressure pulses generated in response to electrical signals in ink channels terminating in the nozzles).

Figure 2:
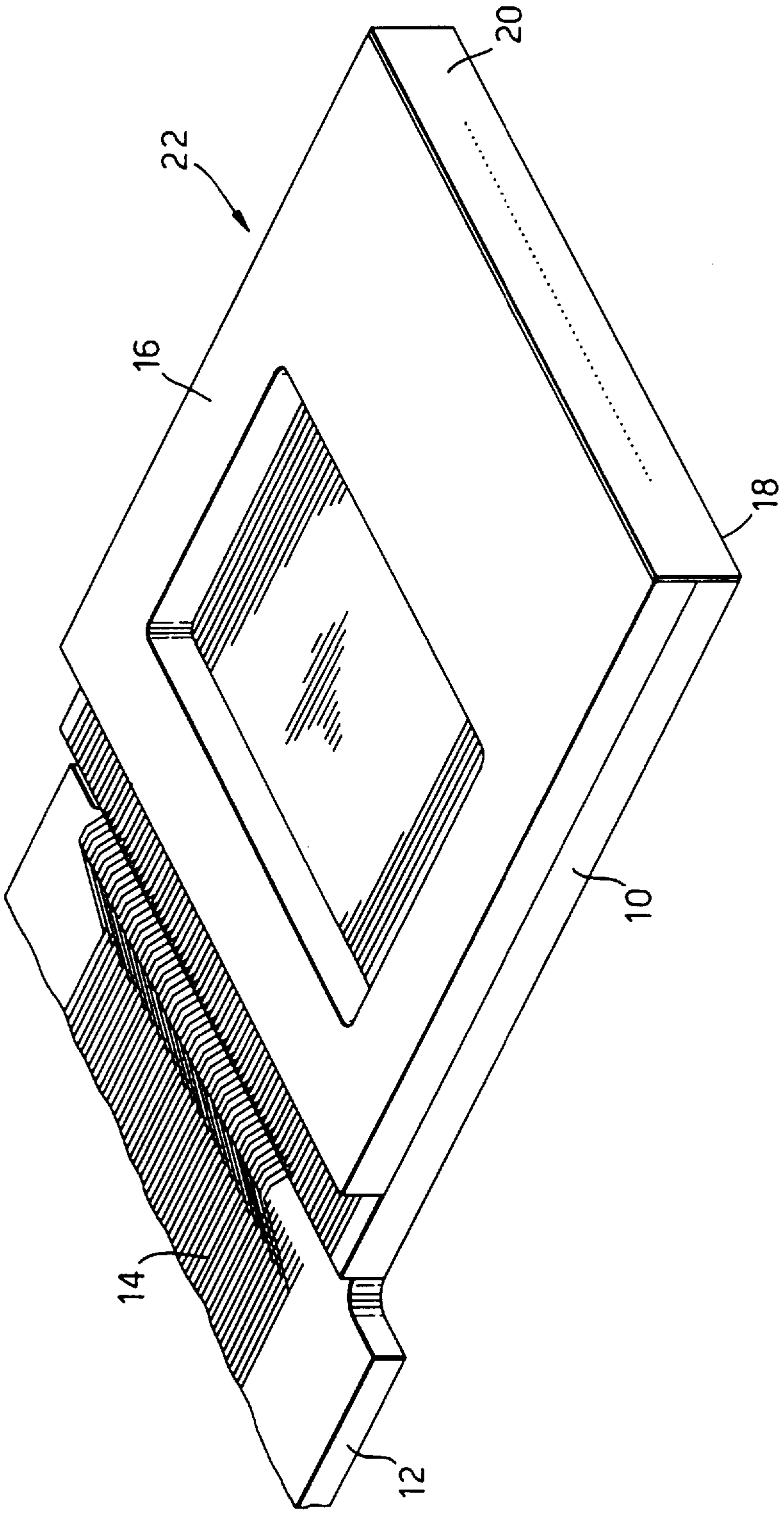
FIG. 2 illustrates the printhead of FIG. 1 in perspective after bonded assembly of the cover and the nozzle plate to the printhead base.

The ink jet printhead 22 is illustrated in FIG. 2 after assembly by bonding. The nozzle plate 18 is shown in this diagram after it has been attached by a glue bond layer to the printhead body and following the formation of nozzles in the nozzle plate by UV excimer laser ablation. A method of forming the nozzles is described in U.S. Pat. No. 5,189,437 (EP-A-0309146).

One aspect of the above patented method is that nozzles are formed in the nozzle plate after the nozzle plate is bonded to the printhead. This amongst other advantages enables the nozzles to be formed accurately in register with the ink channels in the printhead body, at a uniform nozzle spacing controlled by an optical mask and with optically determined nozzle axes parallel to one another. All of these parameters contribute to ink drop placement accuracy during printing and therefore to print quality and are capable of reproduction in printheads having a wide width. The accuracy of the ink drop volume ejected for printing also depends on obtaining accurate control of nozzle diameter. For nozzles which are tapered towards the nozzle exit and which are formed angling or by rocking the incident beam of light directed through coplanar apertures in a mask onto the nozzle plate during the ablation process, the nozzle diameters depend on the axial locations of the exit face of the nozzle plate. Evidently, variations in the axial locations of the nozzle plate result in substantial variation in the nozzle diameters in the corresponding regions of nozzle plate. It is therefore necessary to maintain the exit face of the nozzle plate flat to optical quality after bonding, to ensure uniform nozzle and drop size and therefore print quality. The exit face of the nozzle plate should preferably be flat to within 4 or 5 μm and, it may in certain cases be desirable to achieve flatness to within 1 μm.

Figure 3:
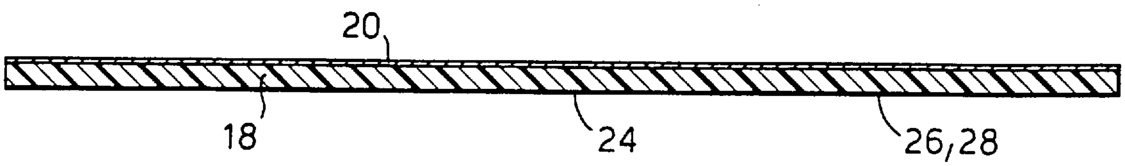
FIG. 3 shows a section of the nozzle plate normal to the array direction.
Figure 4:
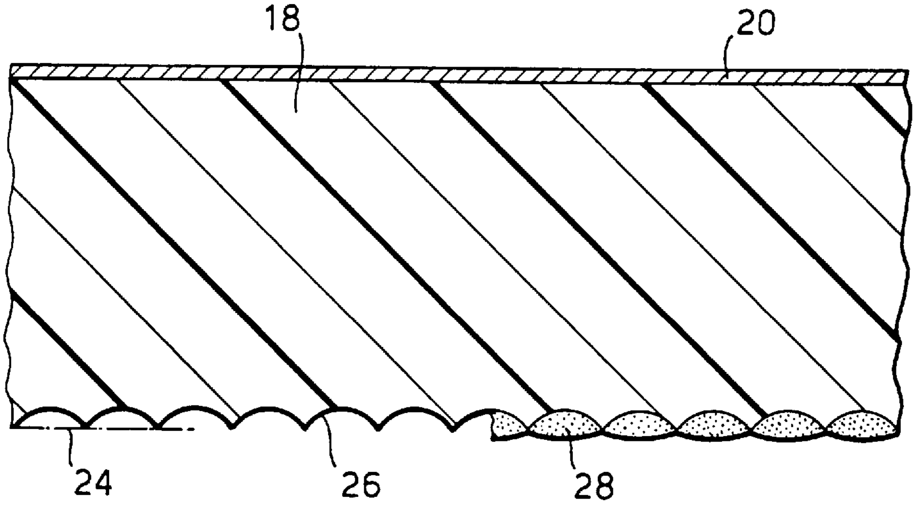
FIG. 4 shows a fragmentary detail of the section of FIG. 3, showing the micro-cavities of the nozzle plate at enlarged scale.

A detail of the nozzle plate 18 is illustrated in FIGS. 3 and 4. FIG. 3 shows a section of the nozzle plate normal to the nozzle array direction. FIG. 4 shows a fragmentary detail of the section in FIG. 3 at enlarged scale. The nozzle plate material is a chemically resistant ablatable polymer in sheet form, preferably such as polyester, polyether ether ketone or polyimide. One advantage of polyimide, in particular Upilex R or S (Upilex is a trademark of Ube Industries), is that this material ablates uniformly leaving a smooth ablated surface and after ablation presents a high energy surface populated with chemical bond sites. Another advantage is that these polyimide polymer materials have a relatively low thermal expansion coefficient. Moreover they are obtainable in sheet form in a particularly flat condition approximating to a optically flat or mirror surface, appropriate for the nozzle exit face.

The nozzle plate 18 is coated on the exit face of the nozzle plate with a low energy coating 20 as specified above. In the other surface 24 are formed micro-cavities and bonding surface lands shown together in the form of corrugations 26. The corrugations are typically 2–4 μm deep and of spacing or wavelength 10–20 μm. One method of forming the corrugations 26 is by excimer laser ablation, by exposing the surface to light energy having a spatial intensity variation corresponding to the corrugated wavelengths. Only 5–10 pulses are required to trench the surface 24 to the depth required. One advantage of ablation is that the structures are formed in the plate material 18 without residual stress, which could cause the thin sheet 18 to curl up. Another advantage previously indicated is that the surface is removed by ablation, exposing a high energy surface populated in chemical bond sites for gluing in place of the original rolled surface 24 which is smooth and has a low energy surface with poor bond characteristics. For this reason it is advantageous for the entire surface to be subjected to a degree of ablation, including the bonding surface lands and not merely those regions of the surface which are the intended sites of micro-cavities.

The spacing of the corrugations in the nozzle plate is selected in accordance with the dimensions of the printhead. Generally speaking, the smaller the printhead, the finer the dimensions required for the corrugations or other structures providing the desired micro-cavities and surface lands. In the example under consideration, a typical dimension of a channel separating side wall at the termination plane of the channels, would be 60 μm (being the channel spacing) by 300 μm, and it is in this context that a spacing or wavelength for the corrugations of 10 to 20 μm is preferred. Generally, it is felt that at the termination plane, the cross sections of each channel separating side wall should span at least three surface lands in the nozzle plate.

After corrugation, the nozzle plate 18 is coated with a glue bond layer 28 (shown in only a part of the section in FIG. 4) for example, solvent resistant curable epoxy such a Epotek epoxy 353-ND or a thermoplastic such as an ethylene vinyl acetate with high polyethylene content. The amount of glue applied is sufficient to fill completely the corrugations 26, with very little (i.e. 1–2 μm) of excess glue or no excess at all.

The nozzle plate bonding method is illustrated by reference to FIG. 5. This illustrates the nozzle plate 18 pressed onto the body of the printhead 22 by means of a heated anvil 30. The printhead body 22 is dressed for example by lapping, grinding or by dicing with a rotary slitting saw so that the face 32 in the region where the ink channels 29 terminate is planarised. Typically the face 32 is finished so that its surface roughness is less than the roughness (i.e. the root mean square of the surface depth variation) of the corrugations 26 formed on the nozzle plate. At the same time the mean surface plane of the face 32, which determines the end plane of the ink channels in the body 22 is flat. Also the anvil 30 where it presses against the outer face of the nozzle plate 18, is flat preferably to optical quality so that the nozzle plate outer surface after bonding is also flat to optical quality. The anvil is also provided with an energy source which heats the nozzle plate and the glue layer producing bond formation.

Figure 6:
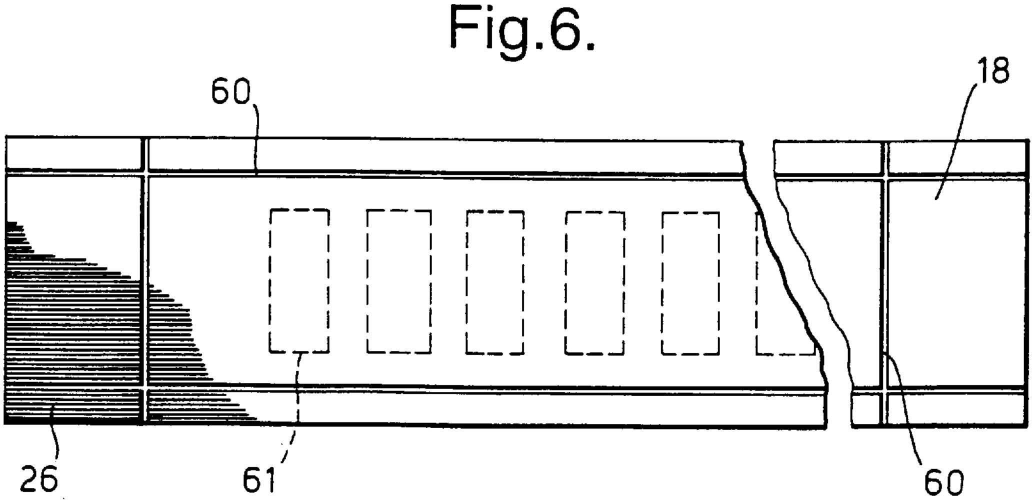
FIG. 6 is a plan view of a modified nozzle plate according to the invention.

When the nozzle plate 18 coated with the glue bond layer 28 is pressed against the face 32 and heated, the glue becomes liquid and its viscosity falls. This allows some glue to flow within the plane between the mating surfaces until the crests of the corrugations 26 are pressed on to the face 32. The amount of glue that is available to flow under the action of the anvil pressure into the ink channels 29 is therefore limited by the amount of excess glue coated on the corrugations during application of the glue bond layer 28 to the nozzle plate 18. However, as shown in FIG. 6, grooves 60 may be cut in the nozzle plate 18 to accommodate excess glue which can flow from the flat areas above and below the channels the locations of which are shown in FIG. 6 in dotted outline at 61. The grooves 60 therefore further assist in preventing the flow of excess glue into the channels. The grooves 60 may typically be 15 μm wide and a similar depth.

The temperature of the anvil is chosen so as to cause the viscosity of the glue to fall allowing it to flow by capillary adhesion into the pores or crevices of the face 32 to form a bond. The viscosity for this to occur is typically less than $10^3$ Pa.s, and if necessary less than 1 Pa.s, in order to effect kinetic spreading of the glue and formation of the glue bond, in the time available for the bonding process step during manufacture. In addition, the time and temperature for the application of heat via the anvil may be chosen, in the case of a curable epoxy resin glue layer to effect the cure process of the glue. However, in the case of a thermoplastic glue bond layer, the cycle time and temperature are chosen simply to complete the kinetics of glue bond spreading and bond formation before cooling. If, as a practical matter difficulties are encountered with glue on the anvil, it will be possible to treat the anvil surface with a non-wetting coating.

The preferred epoxy EPOTEK 353ND when mixed at room temperature has a viscosity of about 1.5 Pa.s. If heated soon after mixing to 60° C., the viscosity falls initially to perhaps 80 m Pa.s and then cures, reaching 20 Pa.s after one hour and being fully cured after about 90 minutes. At 100° C. the initial viscosity falls to about 6 m Pa.s and curing takes place in about 5 minutes. In a preferred process, the nozzle plate is heated in the bonding jig to 100°–120° C. to minimize the cure cycle, and the initial viscosity becomes very low. If required, 2% to 4% of R202 Silica Flour (Degussa) can be added to keep viscosity above 1 Pa.s.

When the nozzle plate has cooled after glue bond formation, the nozzle plate shrinks due to the differential thermal expansion which exists between nozzle plate 18 and the printhead body 22 so that a shear stress is established in the plane of the glue bond. However, peel strength tests show that when corrugations 26 are used this stress is not of a magnitude sufficient to cause failure of the glue bond formed in the above manner. This is due in part to the increased glue bond thickness due to the height of typically 2–4 μm of the corrugations 26 in the nozzle plate due to which the magnitude of the shear stresses is reduced. Also the failure stress of the bond is increased due in part to preparation by the ablation of the nozzle plate, so that its surface energy is raised and the population of bond sites enhanced over the sheet as supplied, and also due to the greater surface area for bonding provided by the corrugations 26. For this reason, the failure stress possessed by the bond layer adjacent the nozzle plate 18 of the present invention is increased above the level provided by a plane sheet and printhead life is enhanced.

It will be evident that a number of variations of the bond design or process may be adopted in the nozzle glue bond applied to a printhead without departing from the scope of the invention. The form of corrugation described and illustrated by reference to FIGS. 3–5 consists of linear grooves of wavelengths 10–20 μm separated by bonding surface lands at the crests of the corrugations which are pressed against and contact the face of the printhead. The micro-cavities and lands may however take any other form of grooving, cross-hatching or stipple pattern, provided that the lands of the corrugated pattern when pressed against the printhead body make contact at a sufficient number of locations in any area of plate 18 so that the front face of the plate 18 remains flat and that the micro-cavities formed in the bonding surface are sufficiently deep to accommodate a mean glue depth which limits the stresses induced in the bond layer on cooling. The lands need occupy only 1% or less of the projected bond area of the plate. With two dimensional groove arrangements, an array of interconnected micro-cavities and lands can be produced. This interconnection may be of advantage in permitting an equalizing flow of glue between micro-cavities during bond formation.

Figure 5:
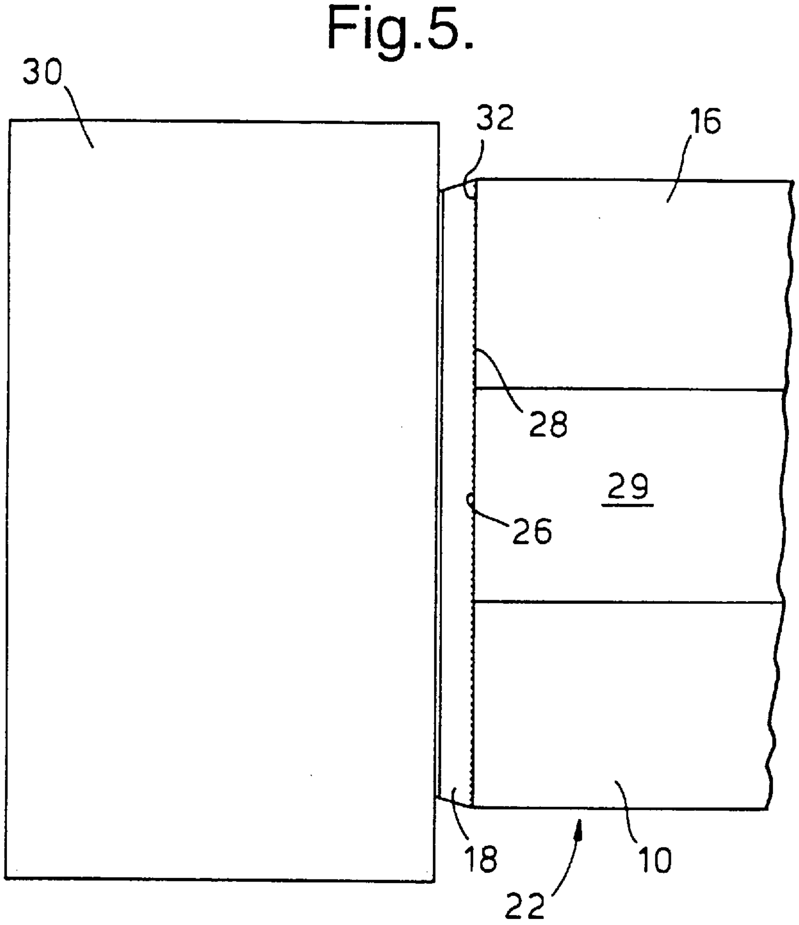
FIG. 5 illustrates the nozzle plate bonding process.

The patterns of micro-cavities and lands in FIGS. 3–5 were described above as being formed by excimer laser ablation by radiation having a spatial intensity variation corresponding to the corrugation wavelength. Despite the advantages this process offers because of the rapid rate of processing and the surface quality suitable for bonding which it provides, the corrugations may be provided by other suitable means such as grinding or machining or by moulding. However, there is a tendency when mechanical cutting or pressing is employed for the original sheet of which the nozzle plate is formed to curl up as a result of mechanical working or due to asymmetry and so lose its original flat condition. It will also be possible to corrugate the face 32 of the printhead body and/or to apply the glue bond layer wholly or in part to it, although these alterations are not considered to provide so convenient or reliable process steps as are described above in more detail. The method of heating the anvil 30 includes not only the supply of heat from an electrical heater or a fluid heat source in the anvil, but may also include heating through a transparent anvil by radiation or the development of heat in the bond layer by ultrasonic radiation, or any other method of heating whereby the glue bond layer viscosity is lowered during bonding to effect kinetic spreading of glue and the development of bond adhesion. The nozzle plate is described as being applied by heat and pressure, but neither is essential to practice the invention. If the glue material applied to the corrugations 26 of the nozzle plate is an epoxy and is initially liquid on application, the glue will flow and progressively wet the face 32 causing it to adhere to the body of the printhead. The capillary adhesion forces also hold the plate 18 in place and replace the need for applied pressure. The cure can then be triggered by a UV catalyst as an alternative to cure initiation by heating.

I claim:

1. A method of making multichannel droplet deposition apparatus, comprising the steps of forming a body with a plurality of parallel channels terminating in a common channel termination plane; providing a nozzle plate for mounting on the body at the termination plane to provide, through apertures in the nozzle plate, respective droplet ejection nozzles for the channels; said nozzle plate having a bonding surface provided with surface micro-cavities and bonding surface lands and with adhesive flow channel means disposed so as in the assembled apparatus to be spaced in the termination plane from the channels; applying adhesive to the bonding surface of the nozzle plate so as to fill said cavities; placing the nozzle plate in register with the body; bringing the lands of the nozzle plate bonding surface substantially into contact with the termination plane of the body; and promoting hardening of the adhesive.

2. A method according to claim 1, wherein the micro-cavities in the nozzle plate are formed by the removal of material from a surface of a nozzle plate blank.

3. A method according to claim 2, wherein said surface of the nozzle plate blank is flat to within 5 $\mu$m.

4. The method according to claim 2, wherein said surface of the nozzle plate blank is flat to within 1 $\mu$m.

5. A method according to claim 1 wherein the surface of the nozzle plate opposing said bonding surface is flat to within 5 $\mu$m.

6. A method according to claim 1, wherein the micro-cavities are formed using a laser beam.

7. A method according to claim 6, wherein the micro-cavities are formed by ablation.

8. A method according to claim 7, wherein the laser beam acts to increase the surface energy of the bonding surface of the nozzle plate.

9. A method according to claim 1, wherein the nozzle plate is formed of polymer.

10. A method according to claim 1, wherein the micro-cavities are formed in a regular array.

11. A method according to claim 10, wherein the micro-cavities take the form of corrugations.

12. A method according to claim 11, wherein the corrugations have a wavelength of between 5 and 50 $\mu$m.

13. A method according to claim 11, wherein the corrugations have a wavelength of between 10 and 20 $\mu$m.

14. A method according to claim 1, wherein the micro-cavities occupy at least 10% of the bonding surface of the nozzle plate.

15. A method according to claim 14, wherein the micro-cavities occupy at least 50% of the bonding surface of the nozzle plate.

16. A method according to claim 15, wherein the micro-cavities occupy at least 90% of the bonding surface of the nozzle plate.

17. A method according to claim 1, wherein the step of bringing the lands of the nozzle plate bonding surface substantially into contact with the termination plane of the body, comprises applying contact pressure.

18. A method according to claim 17, wherein the step of applying contact pressure involves the use of an anvil.

19. A method according to claim 18, wherein the anvil is heated.

20. A method according to claim 1 wherein the step of bringing the lands of the nozzle plate bonding surface substantially into contact with the termination plane of the body, comprises promoting the flow of adhesive under capillary forces.

21. A method according to claim 20, comprising the step of applying heat.

22. A method according to claim 1, wherein nozzle apertures are formed in the nozzle plate after bonding of the nozzle plate to said body.

23. A method according to claim 22, wherein the nozzle apertures are formed by laser ablation.

24. A method according to claim 1, wherein the micro-cavities have a depth perpendicular to said termination plane of from 2–20 $\mu$m.

25. The method according to claim 1, wherein the surface of the nozzle plate opposing said bonding surface is flat to within 1 $\mu$m.

26. A method of making multichannel droplet deposition apparatus, comprising the steps of forming a body with a plurality of parallel channels terminating in a common channel termination plane; providing a first bonding surface at said channel termination plane; providing a nozzle plate for mounting on the body at the termination plane to provide, through apertures in the nozzle plate, respective droplet ejection nozzles for the channels; providing a second bonding surface on said nozzle plate; forming in one of said first and second bonding surfaces a regular array of surface micro-cavities and bonding surface lands, forming in said one bonding surface adhesive flow channel means disposed so as in the assembled apparatus to be spaced in the termination plane from the channels; applying adhesive so as to fill said micro-cavities; placing the nozzle plate in register with the body; bringing the lands of said one bonding surface substantially into contact with the other bonding surface; and promoting hardening of the adhesive.

27. A method according to claim 26, wherein the micro-cavities take the form of corrugations.

28. A method according to claim 27, wherein the corrugations have a wavelength of between 5 and 50 $\mu$m.

29. A method according to claim 27, wherein the corrugations have a wavelength of between 10 and 20 $\mu$m.

30. A method according to claim 26, wherein the micro-cavities occupy at least 10% of said one bonding surface.

31. A method according to claim 30, wherein the micro-cavities occupy at least 50% of said one bonding surface.

32. A method according to claim 31, wherein the micro-cavities occupy at least 90% of said one bonding surface.

33. A method according claim 26 wherein the micro-cavities are formed using a laser beam.

34. A method according to claim 33, wherein the micro-cavities are formed by ablation.

35. A method according to claim 26, comprising the step of increasing the surface energy of at least one of said bonding surfaces.

36. A method according to claim 35, wherein the surface energy of said one bonding surface is increased in the laser beam formation of micro-cavities therein.

37. A method according to claim 26, wherein nozzle apertures are formed in the nozzle plate after bonding of the nozzle plate to said body.

38. A method according to claim 37, wherein the nozzle apertures are formed by laser ablation.

39. A method according to claim 26, wherein the micro-cavities have a depth perpendicular to said termination plane of from 2–20 $\mu$m.

40. A method according to claim 39, wherein the micro-cavities have a depth perpendicular to said termination plane of from 2–5 $\mu$m.

* * * * *

UNITED STATES PATENT AND TRADEMARK OFFICE

CERTIFICATE OF CORRECTION

PATENT NO. : 5,855,713

DATED : January 5, 1999

INVENTOR(S) : Robert Alan Harvey

It is certified that error appears in the above-identified patent and that said Letters Patent is hereby corrected as shown below:

Under "Related U.S. Application Data" appearing on the title page, in item [63], change "PCT/GB74/0234, Oct. 22, 1993" to --PCT/GB94/02341, Oct. 24, 1994--.

Signed and Sealed this

Thirteenth Day of April, 1999

*Attest:*

Q. TODD DICKINSON

*Attesting Officer*

*Acting Commissioner of Patents and Trademarks*